US006445531B1

(12) United States Patent
Gaertner et al.

(10) Patent No.: US 6,445,531 B1
(45) Date of Patent: Sep. 3, 2002

(54) DISC DRIVE METHOD AND APPARATUS FOR DYNAMICALLY ADJUSTING SEEK OPERATIONS

(75) Inventors: Mark A. Gaertner, Woodbury; Paul A. Galloway, Prior Lake; Bruce J. Routh; Zip Cotter, both of Eden Prairie; Daniel C. Kuhl, Saint Paul, all of MN (US); Jason D. Gregg, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/415,787

(22) Filed: Oct. 8, 1999

Related U.S. Application Data

(60) Provisional application No. 60/103,690, filed on Oct. 9, 1998.

(51) Int. Cl.[7] .................................................. G11B 5/596
(52) U.S. Cl. .................................................. 360/78.06
(58) Field of Search ............................... 360/78.06, 75, 360/78.04, 78.09; 318/636, 600, 561

(56) References Cited

U.S. PATENT DOCUMENTS

| | | | |
|---|---|---|---|
| 4,899,234 A | 2/1990 | Genheimer | 360/78.06 |
| 4,937,689 A | 6/1990 | Seaver et al. | 360/78.07 |
| 4,972,350 A | 11/1990 | Sander et al. | 369/44.28 |
| 4,980,876 A | 12/1990 | Abate et al. | 369/44.11 |
| 5,003,415 A | 3/1991 | Freeze | 360/78.06 |
| 5,050,146 A | 9/1991 | Richgels et al. | 369/32 |
| 5,060,210 A | 10/1991 | Fennema et al. | 369/32 |
| 5,063,454 A | 11/1991 | Hashimoto | 360/78.04 |
| 5,132,855 A | 7/1992 | Waugh et al. | 360/78.07 |
| 5,291,110 A | 3/1994 | Andrews, Jr. et al. | 318/560 |
| 5,383,068 A | 1/1995 | Shimizu et al. | 360/78.06 |
| 5,465,034 A | 11/1995 | Andrews, Jr. et al. | 318/560 |
| 5,475,545 A | 12/1995 | Hampshire et al. | 360/78.06 |
| 5,570,332 A | 10/1996 | Heath et al. | 369/50 |
| 5,657,179 A * | 8/1997 | McKenzie | 360/78.06 |
| 5,668,680 A * | 9/1997 | Tremaine | 360/78.07 |
| 5,691,617 A * | 11/1997 | Funches | 360/78.04 X |
| 5,760,992 A | 6/1998 | Phan et al. | 360/78.07 |
| 5,825,581 A | 10/1998 | Morita et al. | 360/78.04 |
| 5,886,846 A | 3/1999 | Pham et al. | 360/78.04 |
| 5,890,209 A | 3/1999 | Dobbek | 711/112 |
| 5,901,009 A | 5/1999 | Sri-Jayantha et al. | 360/78.07 |
| 5,903,410 A | 5/1999 | Blaum et al. | 360/77.08 |
| 5,914,829 A | 6/1999 | Kadlec et al. | 360/78.04 |
| 5,917,439 A | 6/1999 | Cowen | 341/96 |
| 5,917,669 A | 6/1999 | Johnson et al. | 360/53 |
| 5,917,672 A | 6/1999 | Pham et al. | 360/78.09 |
| 6,101,065 A * | 8/2000 | Alfred et al. | 360/78.04 |
| 6,195,222 B1 * | 2/2001 | Heminger et al. | 360/78.07 |

OTHER PUBLICATIONS

JP–A–01–245471 NTT.
JP–A–63–87663 Hitachi Ltd.

\* cited by examiner

Primary Examiner—David Hudspeth
Assistant Examiner—K. Wong
(74) Attorney, Agent, or Firm—Westman, Champlin & Kelly, P.A.

(57) ABSTRACT

A method of controlling an actuator in a disc drive to move a data head to implement an access in accordance with the invention includes determining a first rotational position corresponding to a rotational position of the data head when the access will start and determining a second rotational position corresponding to a rotational position of the data head at a destination of the access. Subsequently, an access time required to move the data head from the first rotational position on a current or initial track to the second rotational position on a destination track using a fastest of multiple seek profiles is determined. A slower or slowest of the multiple seek profiles which can be used to move the data head from the first track to the second track within the access time is determined. Subsequently, the actuator is controlled using the determined slower or slowest of the multiple seek profiles to implement the access. In addition, a disc drive is provided.

20 Claims, 8 Drawing Sheets

DISC DRIVE METHOD AND APPARATUS FOR DYNAMICALLY ADJUSTING SEEK OPERATIONS

CROSS-REFERENCE TO RELATED APPLICATION

The present invention claims priority to Provisional Application Ser. No. 60/103,690, filed Oct. 9, 1998 and entitled METHOD OF DYNAMICALLY ADJUSTING SEEKS TO MINIMIZE GENERATION OF ACOUSTIC NOISE AND POWER CONSUMPTION WHILE MAINTAINING HIGHEST LEVEL OF PERFORMANCE.

FIELD OF THE INVENTION

The present invention relates to disc drive data storage systems. More specifically, the present invention relates to methods and apparatus for performing a seek in a disc drive data storage system.

BACKGROUND OF THE INVENTION

A disc drive data storage system includes a data storage disc providing a disc surface that has concentric data tracks, a data head that can read/write to the disc surface, and an actuator which supports the data head above the disc surface. Movement of the actuator causes movement of the data head.

In disc drives, an access can be defined as the movement of the data head relative to the disc surface from the end of one read/write on the disc surface to the beginning of the next read/write on the disc surface, but not including the actual reading/writing. The access time is made up of two time components: seek time and latency time. The seek time component is the time taken to travel from the track on which one read/write completes to the track on which the next read/write begins. The second time component, the rotational latency time, is the time the disc drive spends waiting for the appropriate data to rotate under the head after the head has arrived at the track on which the next read/write begins. The rotational latency time can be a significant part of the access time for all but the longest seeks. It is the dominant component of the access time for relatively short seeks. In some prior art disc drive data storage systems, commands sent by a host computer are executed in an optimum order to minimize both radial movement of the data head and also rotational latency.

In spite of the advantages gained by optimizing the execution of commands, lack of control over the number of commands and the time between commands arriving from the host computer imposes limitations in the optimization techniques. Thus, significant rotational latency still exists in current systems.

Access operations are typically a combination of rapid movement of the actuator that moves the data head to the desired track followed by a wait period for the appropriate data to come under the head. Rapid movement of the actuator causes problems in the disc drive data storage systems such as increased vibration, an increase of emitted acoustics, high power consumption, and generally a higher stress factor to the overall mechanics.

The present invention provides a solution to these and other problems, and offers advantages over the prior art.

SUMMARY OF THE INVENTION

The present invention relates to disc drive data storage systems which reduce vibrations, acoustics and/or power consumption without increasing access times.

In accordance with one embodiment of the present invention, a seek method of controlling an actuator to move a data head includes determining a first rotational position corresponding to a rotational position of the data head when the seek will start and determining a second rotational position corresponding to a rotational position of the data head at a destination of the seek. An access time required to move the data head from for the first rotational position on a current track to the second rotational position on a destination track, using a fastest of multiple seek profiles, is determined. Subsequently, a slower or slowest of the multiple seek profiles which can be used to move the data head from the current track to the destination track, within the determined access time, is determined. The slower seek profile can be the slowest of the multiple seek profiles which can move the data head within the access time. The actuator is then controlled by using the determined slower or slowest of the multiple seek profiles to move the data head from the current track to the destination track.

These and various other features as well as advantages which characterize the present invention will be apparent upon reading of the following detailed description and review of the associated drawings.

DETAILED DESCRIPTION OF ILLUSTRATIVE EMBODIMENTS

Figure 1:
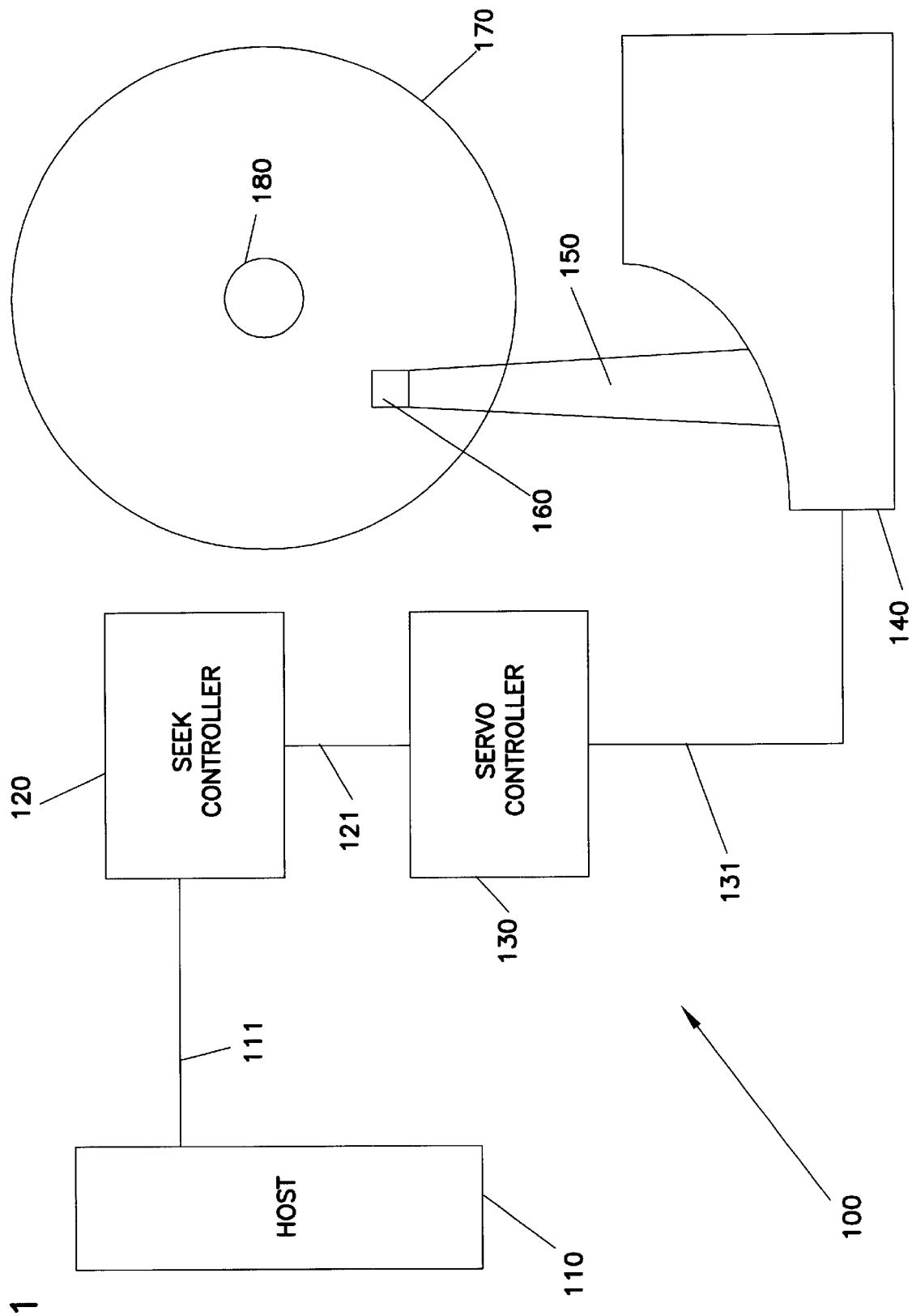
FIG. 1 is a simplified diagram of a disc drive data storage system that performs a seek in accordance with the present invention.

An illustrative embodiment of a disc drive data storage system that performs a seek in accordance with the present invention is shown in FIG. 1. Disc drive data storage system 100 includes seek controller 120, servo controller 130, actuator motor 140, actuator 150, data head 160, disc 170 and spindle 180. Disc drive data storage system 100 is coupled to a host computer 110 that sends commands 111 to seek controller 120. Seek controller 120 optimizes the seek operations corresponding to these commands. The seek controller 120 accordingly sends seek implementation instructions 121 to servo controller 130. Velocity and acceleration control instructions 131 are in turn sent by servo controller 130 to actuator motor 140. Actuator 150 is moved in different directions over the surface of magnetic disc 170 by means of actuator motor 140. Magnetic disc 170 rotates about an axis of spindle 180 which is driven by a motor (not shown). Data head 160 that is supported by actuator 150 reads data from and/or writes data to the disc surface in accordance with the command associated with the optimized seek operation implemented by the actuator motor and by the controllers.

Seek controller 120 and servo controller 130 can each be implemented by separate microprocessors or digital signal processors, or can also be included in the same microprocessor or digital signal processor. Servo controller 130 functions in conformance with instructions it receives from seek controller 120.

In embodiments of the invention, seek controller 120 needs information that includes a rotational position of data head 160 when the access will start and a rotational position of data head 160 at a destination of the access to determine an optimum seek profile for the seek operation. A method that illustrates obtaining and using this information to implement the seek portion of the access is described below.

Figure 2:
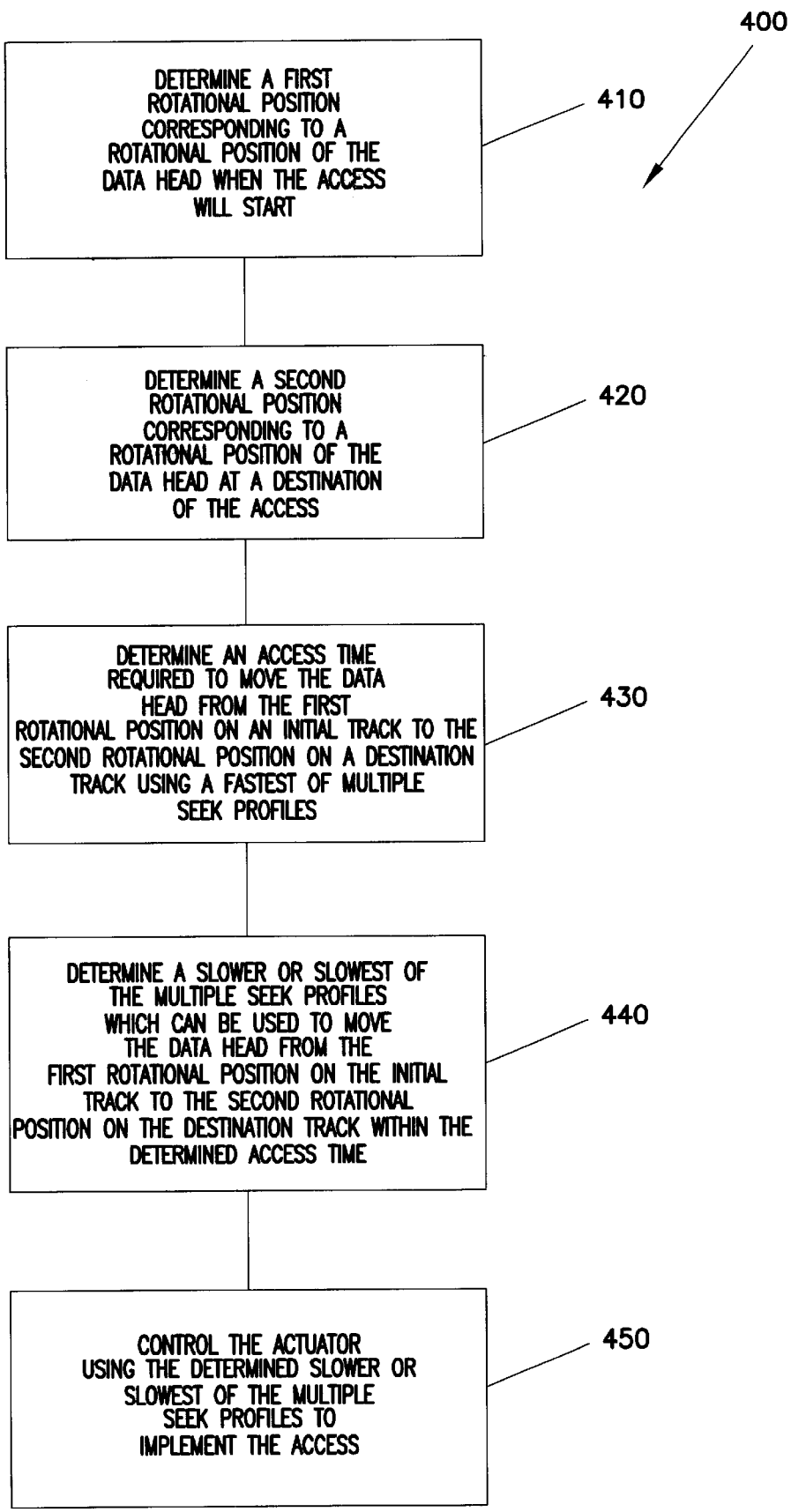
FIG. 2 is a block diagram of the method of implementing the seek operation in accordance with the present invention.

Referring to FIG. 2, block diagram 400 illustrates a method of implementing seek operations for an access in accordance with the present invention. As illustrated at block 410, the method includes determining a first rotational position corresponding to a rotational position of data head 160 when the access will start. As illustrated at block 420, the method also includes determining a second rotational position corresponding to a rotational position of data head 160 at a destination of the access. As illustrated at block 430, an access time required to move data head 160 from the first rotational position on the initial or current track to the second rotational position on the destination track using a fastest of multiple seek profiles is determined. As shown at block 440, a slower or slowest of the multiple seek profiles which can be used to move data head 160 from the current track to the destination track, within the determined access time, is then determined. In some embodiments, a slowest of the multiple seek profiles which can be used to move the data head within the access time is determined. However, in other embodiments, seek profiles which are slower, but not necessarily the slowest, are used. Finally as illustrated at block 450, the method includes controlling actuator 150 using the determined slower or slowest of the multiple seek profiles to move data head 160 to implement the access from the first rotational position on the initial track to the second rotational position on the destination track.

Figure 3:
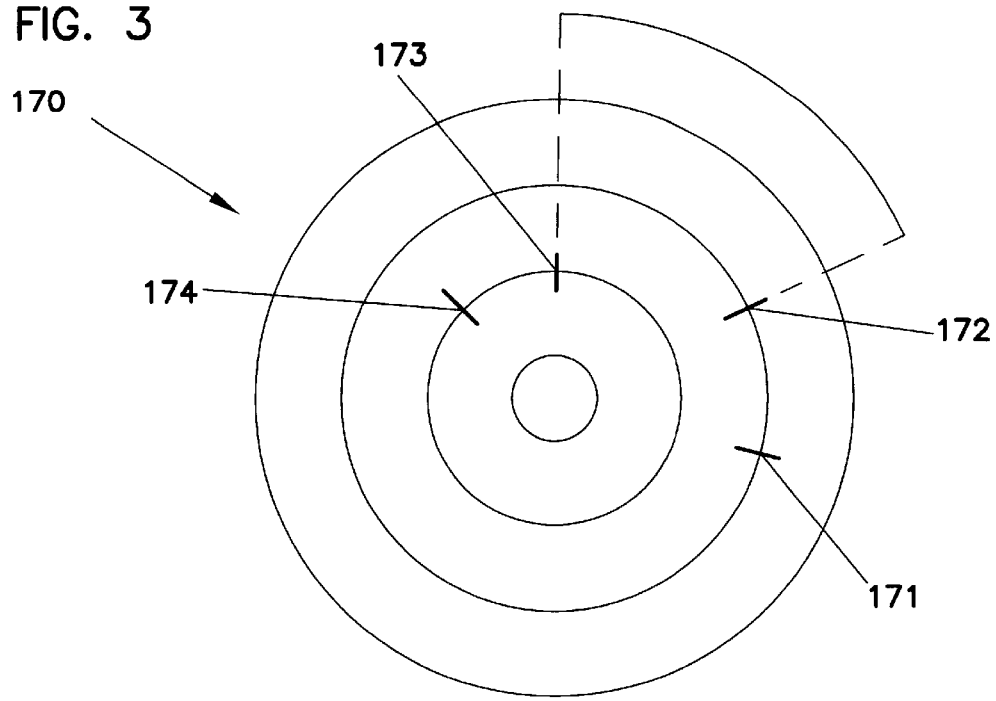
FIG. 3 is a simplified diagram of a disc surface showing a first rotational position and a second rotational position for the seek.

Blocks 410 and 420 include the determination of rotational positions of data head 160 when the access will start and at a destination of the access. Referring to FIG. 3, a beginning rotational position 171 and an ending rotational position 172 of data associated with a first command, and a beginning rotational position 173 and an ending rotational position 174 of data associated with a second command are shown. Implementation of the second command is the target of the access operation.

In some embodiments, a rotational position sorting feature of seek controller 120 maintains the destination position of data head 160, which is the beginning rotational position 174 of the second command. The information for block 420 is therefore determined from the rotational position sorting feature. When servicing queued commands within controller 120, the rotational position sorting feature of seek controller 120 can also identify the ending position of data head 160 for the first command. Generally, the ending position of the currently executing command (first command) is known and the drive will start its access operation for the next command (second command) when the current command (first command) completes.

When host computer 110 issues commands 111 individually in a "single-threaded" mode, with individual commands being received from the host system 110 substantially separate from each other, seek controller 120 can use different methods to determine the position of actuator 150 to provide information required for block 410. Disc hardware can provide assistance in determining the position of data head 160 in a non-queued (single-thread) environment. One technique is for the disc hardware to provide a readable register that indicates the current rotational position of data head 160.

Figure 4:
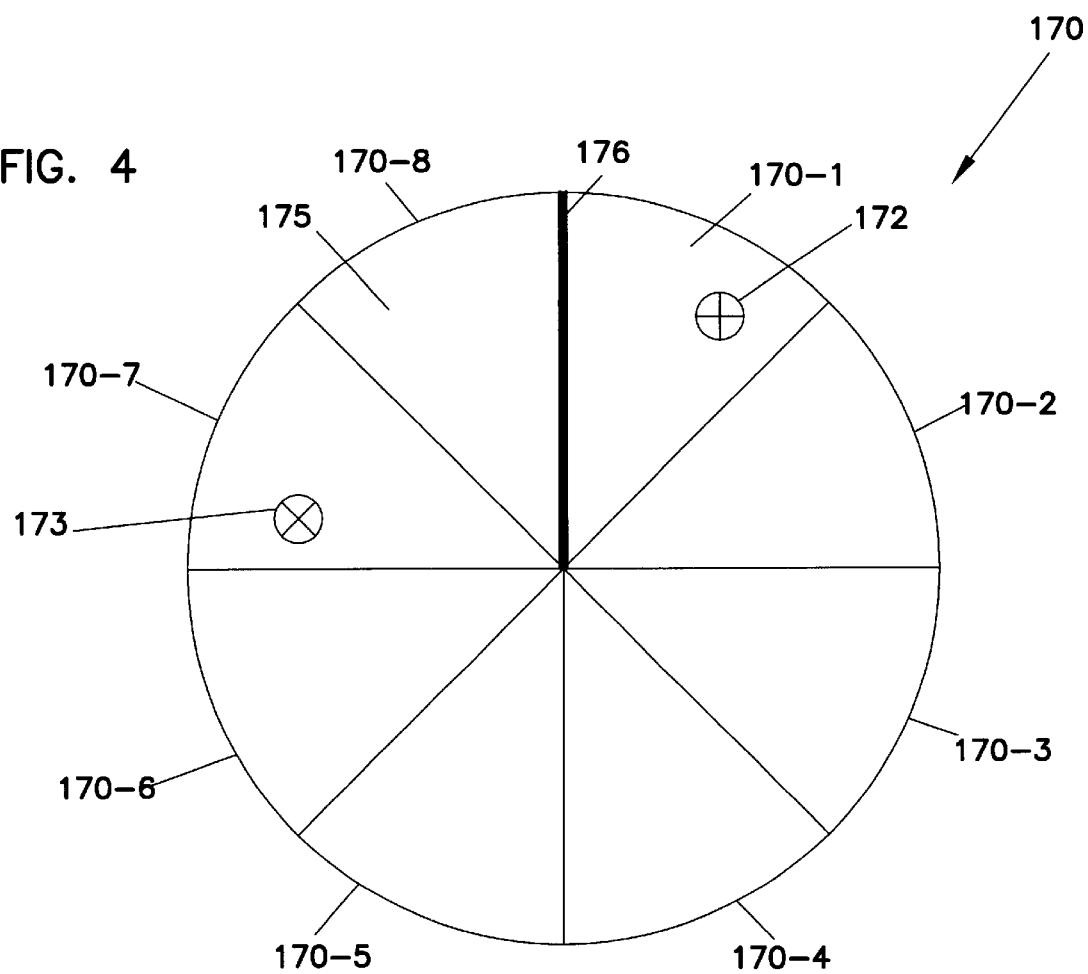
FIG. 4 is a simplified diagram of a disc surface divided into multiple radial sections with each radial section constituting a phase in accordance with a more particular embodiment of the invention.

Another method of determining the position of data head 160 in accordance with the invention utilizes a disc index mark. The index mark passes under data head 160 once per revolution of the disc. FIG. 4 shows a disc surface 175 which can be divided into radial wedge-shaped sections (for illustrative purposes, only sections 170-1, 170-2, 170-3, 170-4, 170-5, 170-6, 170-7 and 170-8 are shown). An index mark 176 can be positioned along a first end of radial wedge shaped section 170-1. Other positions for index mark 176 are also possible. A method of determining the first rotational position (step 410 of FIG. 2) of data head 160 using disc surface 175 with wedge-shaped sections is described below.

Figure 5:
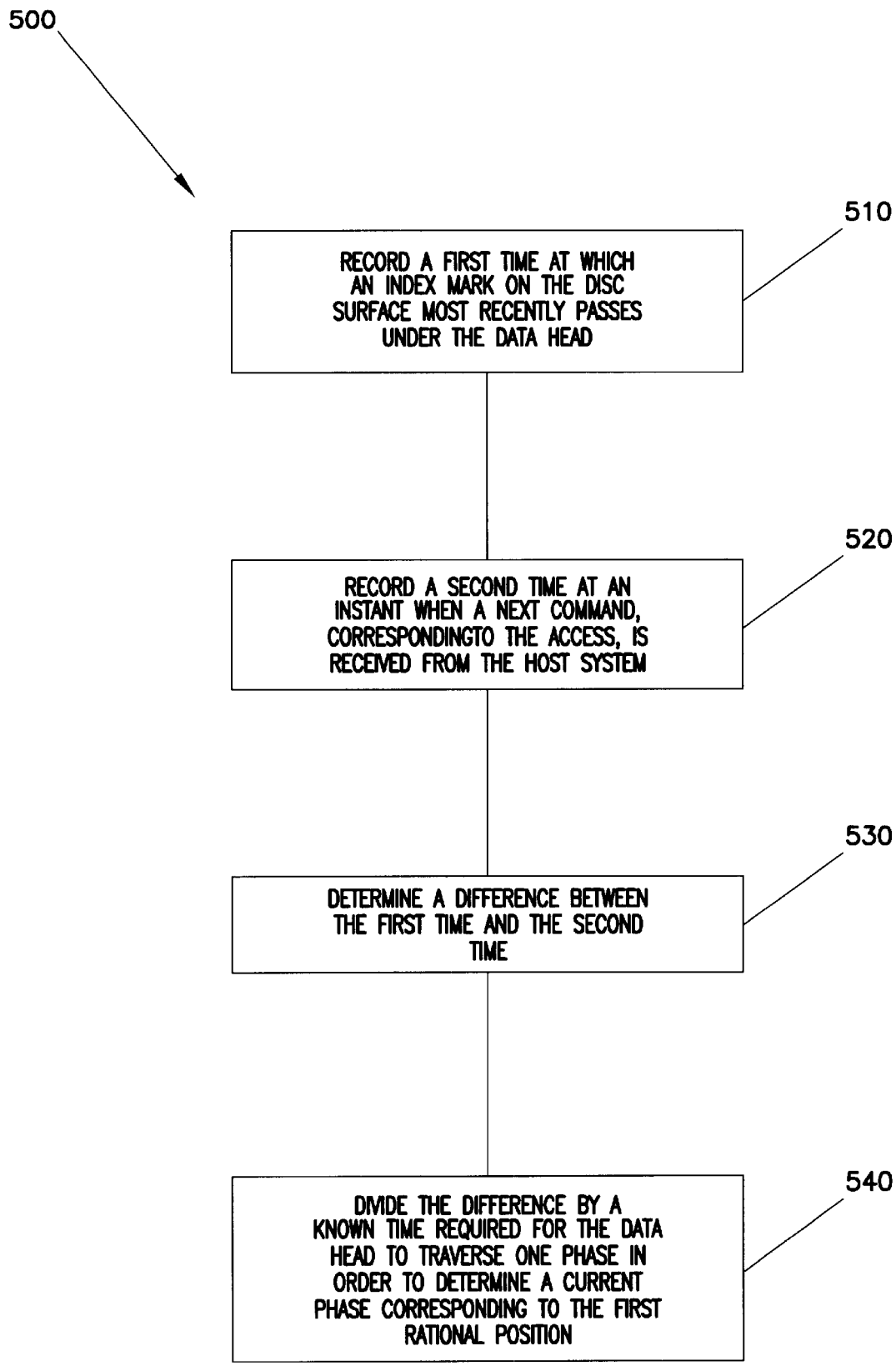
FIG. 5 is a block diagram of the method of determining a first rotational position for the seek in accordance with a more particular embodiment of the present invention.

FIG. 5 is a block diagram 500 of a method of determining the first rotational position for the seek when a disc surface divided into multiple radial sections is employed. Each of the multiple radial sections constitutes a "phase" of the disc. As illustrated at block 510, the method includes recording a first time at which index mark 176 on disc surface 175 most recently passes under data head 160. At block 520, the method includes recording a second time at an instant when a next command, corresponding to the access to be implemented, is received from the host system. The step shown at block 530 includes determining a difference between the first time and the second time. At block 540, the method includes dividing the difference by a known time required for the data head to traverse one phase of the disc surface at a known rotational speed in order to determine a current phase corresponding to the first rotational position.

Recording the first time and the second time according to blocks 510 and 520 can involve the use of a service routine that takes a time stamp with resolution on the order of 50 microseconds. A solution is to employ a single timer to record times associated with blocks 510 and 520 whose difference is thereafter determined as indicated in block 530. The first rotational position is then determined in accordance with block 540. A rotational position calculation is shown below in Equation 1.

$$\text{current\_phase} = (\text{current\_time} - \text{index\_time})/\text{phase\_time} \quad \text{Equation 1}$$

where,
current_phase=the phase of the first rotational position;
current_time=a second time which occurs at an instant when the next command, corresponding to the access, is received from the host system;
index_time=the first time which is the time at which the index mark most recently passes under the data head; and phase_time=a known time required for the data head to traverse one phase.

More than one timer can be use to implement the above calculation of "current_phase ". An example below uses a combination of two timers T5 and T6, where timer T5 is a millisecond timer that counts up and wraps at a count of 65536, while timer T6 has a resolution of 160 nanoseconds and counts down, wrapping at a count of 6250.

The rotational position determining algorithm using these two timers is shown in the following pseudocode, and "current_phase " can be determined using the relationship shown in Equation 2.

If (index_time_tick>time_T6) then relative_time=((time_T5−index_time_ms)*1000)+((index_time_tick−time_T6)*160)/1000

Else relative_time=((time_T5−index_time_ms)*1000)−((time_T6−index_time_tick)*160)/1000 current_phase=relative_time/phase_time      Equation 2 where, the index mark is passed by the data head at the region of the disc surface referred to as phase 0, and where:

- time_T5=the second time indicated by timer T5, which is recorded at an instant when a next command, corresponding to the access, is received from the host system;
- index_time_ms=the first time recorded by timer T5 which is the time at which the index mark most recently passes under the data head;
- time_T6=the second time indicated by timer T6 which is recorded at an instant when a next command, corresponding to the access, is received from the host system;
- index_time_tic=the first time, recorded by timer T6, which is the time at which the index mark most recently passes under the data head;
- relative_time=time difference between the first time and the second time calculated using a combination of readings of timers T5 and T6;
- phase_time=a known time required for the data head to traverse one phase; and
- current_phase=the first rotational position.

As indicated above, instead of measuring current_time and index_time with a single microsecond timer, current_time and index_time measurements are made by both millisecond and nanosecond timers. The readings of both these timers are converted into microseconds. The lack of resolution of the millisecond timer will result in this timer not recording microseconds that have elapsed between successive milliseconds. These missing microseconds can be picked up with the help of the reading of the nanosecond timer. The readings of the nanosecond timer are converted to microseconds and the missing microseconds are added to the microsecond equivalent of the millisecond timer readings. The difference between the current_time and index_time can therefore be obtained with the use of two timers with different resolutions.

Referring back to FIG. 2, the implementation of one of the above methods of determining a first rotational position in accordance with block 410 and a second rotational position in accordance with block 420 provides the necessary information for determination of the access time using the fastest of multiple seek profiles in accordance with block 430. Details of determining the access time are explained below.

The physical difference (or the associated time) between the first rotational position (block 410 of FIG. 2) and the second rotational position (block 420 of FIG. 2) constitutes a phase difference. The phase difference translates directly to access time. If a seek can complete in the time needed for the disc to rotate the phase difference, then the access time is the phase difference multiplied by the constant time required to traverse one phase at a known speed. If the seek cannot complete within this time, then the access time is increased additionally by the time associated with one or more additional disc revolutions needed for the seek to complete. Generally, the seek time can be characterized by the following equation.

Access time=(phase difference*phase time)+(number of revolutions*revolution time)      Equation 3

Determination of an access time by using a fastest of multiple seek profiles in accordance with block 430, and further determination a slowest (or of a slower) of the multiple seek profiles for the determined access time in accordance with block 440, can be accomplished by using a sub-routine implemented within controller 120, "check_difference( )", that takes as inputs the four variables "phase_difference", "seek_distance", "seek_profile", and "revolutions".

The variable phase_difference is the difference between the first rotational position and the second rotational position (does not include the number of revolutions between the two positions). The variable seek_distance is the absolute difference between the cylinder position of the first rotational position and the cylinder position of the second rotational position. The variable seek_profile represents which of multiple seek profiles are being used by controller 120 to implement the seek during the access. For example, in an embodiment having four different possible seek profiles, the seek_profile values "FAST_SEEK", "SLOW_SEEK", "SLOWER_SEEK", AND "SLOWEST_SEEK " represent, from fastest to slowest, the four seek profiles. Any number of seek profiles can be used. Finally, the variable revolutions represents the number of revolutions necessary to perform the access.

The check_difference( ) routine computes whether or not the seek, having a speed of "seek_profile" and a distance of "seek_distance", can complete in the time corresponding to "phase_difference" and "revolutions". A FAIL value to the sub-routine check_difference( ) is returned if the seek cannot complete in the specified time. Code to determine the number of revolutions is shown below.

Establish how many revolutions are required with the fastest seek profile using the following do loop:
revolutions=0; do
if ((status=check_difference(phase_difference, seek_distance, FAST_SEEK, revolutions))==FAIL)
    revolutions++;
while (status==FAIL);

Determining the number of revolutions required to move between the first rotational position on the current or initial track and the second rotational position on the destination track using the fastest seek profile involves first setting the number of revolutions equal to zero. The routine check_difference is then repeatedly performed using the following inputs: 1) the phase difference (phase_difference) determined from the first rotational position and the second rotational position; 2) a seek distance (seek_distance) corresponding to the current (initial) track and the destination track; 3) the fastest of multiple seek profiles (FAST_SEEK); and 4) the number of revolutions (revolutions)

beginning with the initial zero value. The number of revolutions are incremented by one after each repetition of the routine. The routine returns a PASS, stores the number of revolutions, and the repetition terminates if the time (a time computed based upon a time equivalent of the phase difference added to a time equivalent of the number of revolutions for a particular iteration of the routine) is greater than or equal to a time computed using the fastest seek profile (FAST_SEEK) and a previously stored value of the seek distance (seek_distance), otherwise a FAIL value is returned, the number of revolutions incremented, and the routine is repeated.

After determining the number of revolutions using the fastest seek profile, a slowest of multiple seek profiles (SLOWEST_SEEK) which can be used to move the data head from the current track to the destination track within the time determined by the check_difference routine is determined. The same check_difference routine used above can be used to determine the slowest seek profile as described by the following code.

Check if a slower seek will complete in time, this check needs to occur once per slow seek mode:
if
(check_difference(phase_difference, seek_distance, SLOWEST_SEEK, revolutions)==PASS)
    use SLOWEST_SEEK
else if
(check difference(phase_difference, seek_distance, SLOWER_SEEK, revolutions)==PASS)
    use SLOWER_SEEK
else if
(check difference(phase_difference, seek_distance, SLOW_SEEK, revolutions)==PASS)
use SLOW_SEEK
else
    use FAST_SEEK Successive values of seek_profile can be used above until an appropriate seek profile is determined. Slow seek profiles may be approximated with a linear approximation for the entire cylinder range. Tables or other more accurate methods may not be necessary for the slow seek profiles since it may not be imperative to know the seek times precisely for slower seeks. In some embodiments, the linear approximations should be conservative; in other words, they should slightly overestimate the typical maximum seek times. This will prevent the controller from selecting a slow seek mode that will not complete the seek in time. Either the linear approximations or the current phase of the actuator should be adjusted to account for the overhead associated with the above routine and the time to load the seek command. In addition, the servo system may not service the seek command for up to one servo wedge which corresponds to one phase. The above method of determining an optimum seek can be referred to as the 'Just In Time' method as it completes just in time to transfer data. While the described algorithm is particularly useful in determining the slowest acceptable seek profile, one of skill in the art will understand that it can be used to select a seek profile which is slower than the fastest seek profile, but which is faster than the slowest acceptable seek profile.

Once an appropriate seek profile is determined by seek controller 120, seek implementation instructions 121 are sent to servo controller 130. There are several methods by which servo controller 130 uses the optimum seek profile to provide velocity and acceleration instructions 131 to actuator motor 140 which in turn controls the movement of actuator 150. Generally, servo controller 130 provides this control according to one or more velocity demand profiles. An example of these velocity demand profiles is shown in the graphical representations of FIG. 6.

Figure 6:
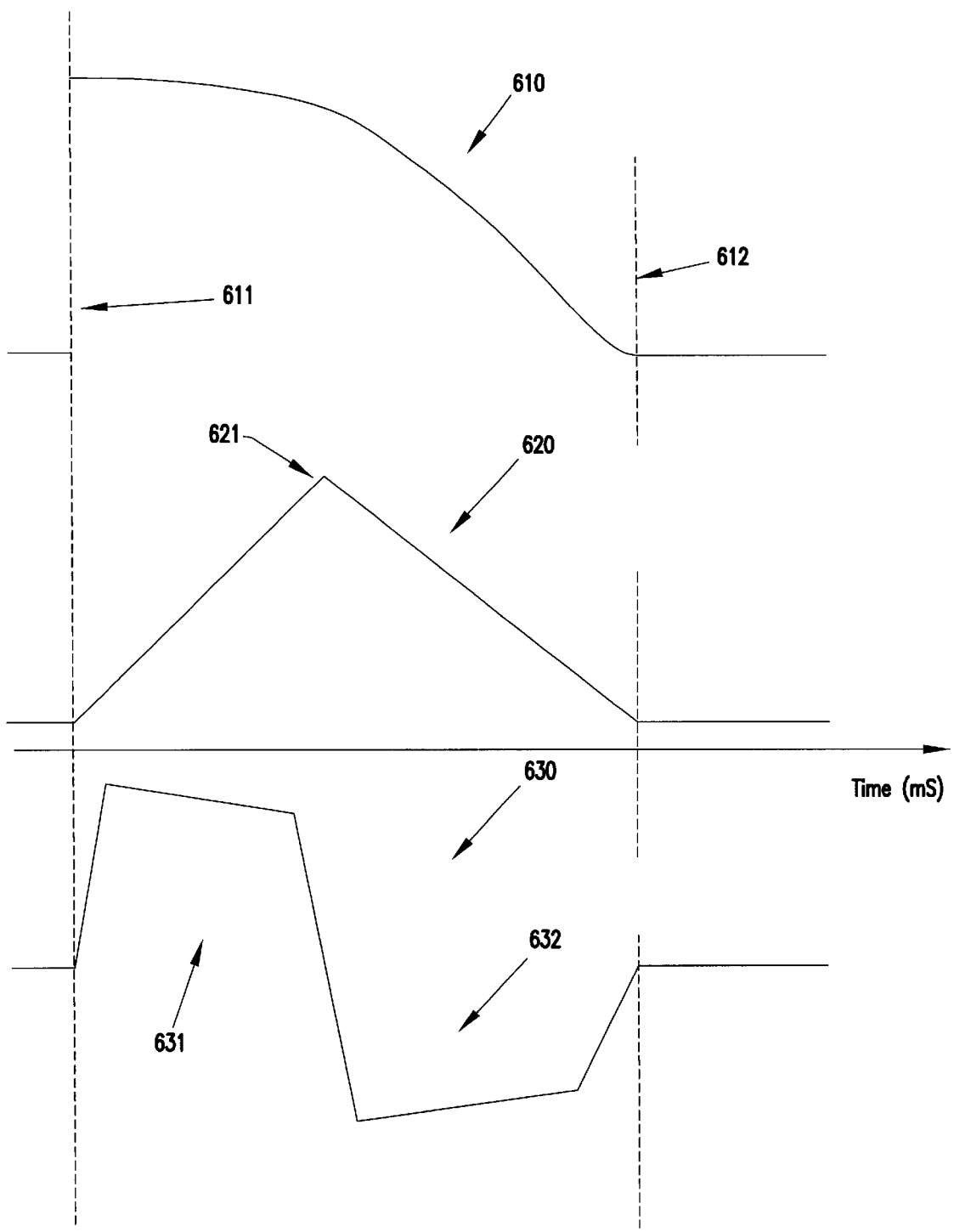
FIG. 6 is a group of graphical representations showing prior art velocity and acceleration patterns for a velocity demand profile.

Shown in FIG. 6 are velocity demand trajectory profile 610, actual actuator velocity profile 620 and a simplified voice coil motor (VCM) current profile 630. These three profiles are illustrated between the start of a seek (designated by reference number 611) and the time of arrival at the destination track (designated by reference number 612). Peak velocity 621 of the actual actuator velocity profile 620, as well as acceleration phase 631 and deceleration phase 632 of the simplified VCM current profile 630, are discussed below with greater detail.

Servo controller 130 computes a 'distance-to-go' from the current track to the destination track. Based upon the distance computed, servo controller 130 will determine which velocity demand profile to select. The number of velocity demand profiles can range from a single trajectory up to as many as deemed necessary to achieve desired performance. These velocity demand profiles can be in the form of hard coded 'look up' tables stored in read only memory (ROM), random access memory (RAM) or flash memory associated with controllers 120 and 130. In the alternative, the velocity demand profiles can take the form of mathematical equations that can be computed real time for every seek made.

At any given 'distance-to-go' from the destination track, the servo controller 130 will look up or compute the corresponding demand velocity profile. This velocity demand profile, modified as a function of the selected slower or slowest acceptable seek profile as described below, is fed into the servo control loop such that an output current from a power amplifier (not shown) will be driven into a voice coil motor (a particular type of actuator motor 140) causing motion of actuator 150 to take place. Disclosed are two methods which can be implemented by servo controller 130 to modify the determined velocity demand profile as a function of the selected seek profile.

Figure 7:
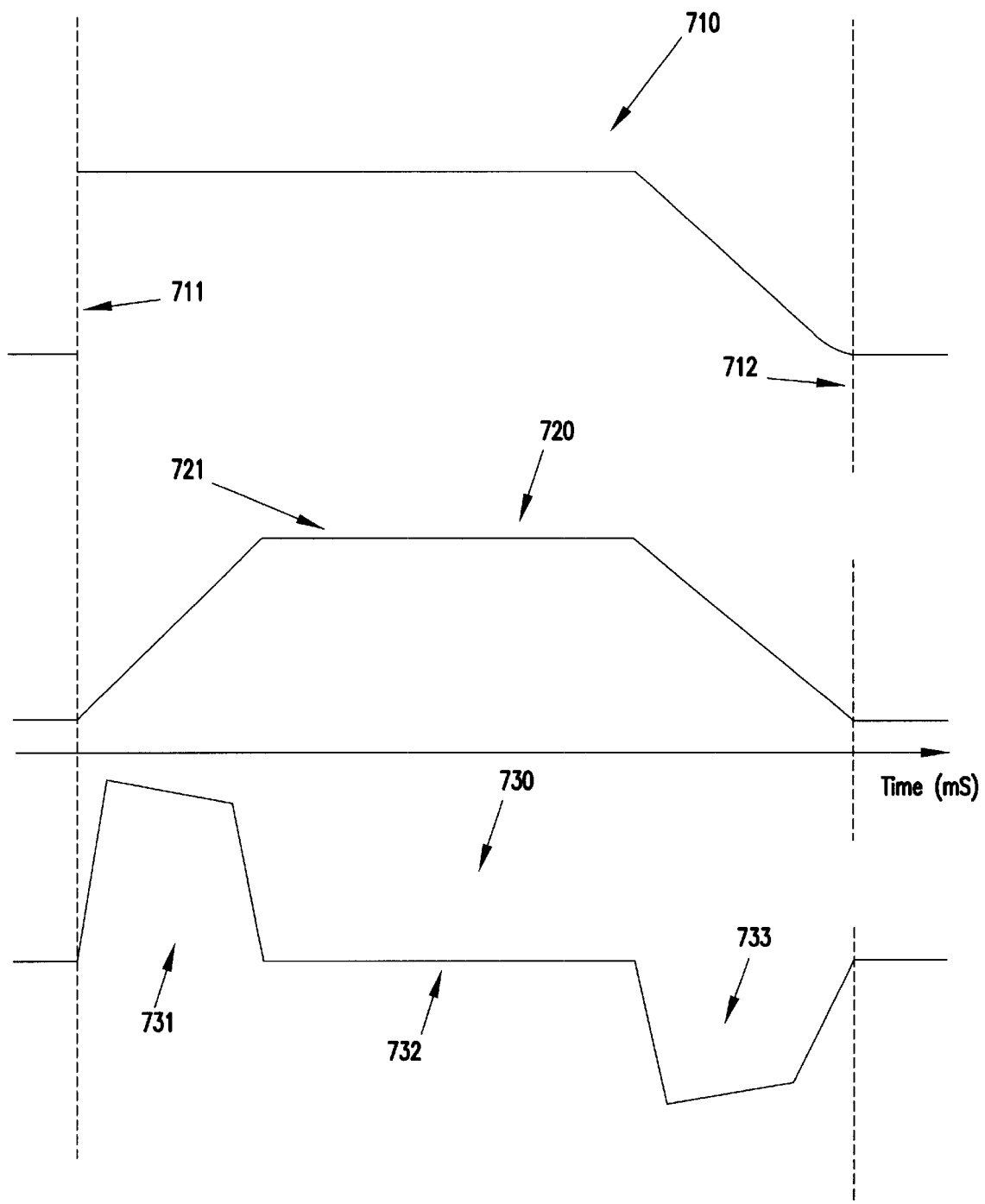
FIG. 7 is a group of graphical representations corresponding to the graphical representations of FIG. 6 with the velocity demand profile altered according to a first method.

In a first method, the acceleration and deceleration curves of the velocity demand profile are not altered in any way. FIG. 7 illustrates velocity demand trajectory profile 710, actual actuator velocity profile 720 and simplified VCM current profile 730 between the time at which the seek starts (designated by reference number 711) and the time of arrival at the destination track (designated by reference number 712). As mentioned earlier, for any given distance-to-go there is a corresponding velocity demand profile with a peak demand velocity value. Typically, there will be a minimum peak velocity or threshold associated with the velocity demand profile. To obtain a lower peak actuator velocity, a lower peak demand velocity is required. The new lower peak demand velocity value is determined as a function of the selected seek profile. The servo controller forces the peak demand velocity to this new value if the peak demand velocity at present distance-to-go is higher than the minimum peak demand velocity.

FIG. 7 is a graphical representation of the above method showing a reduced peak demand velocity value 721 as compared with an original peak demand velocity value 621 shown FIG. 6. The Velocity Demand Trajectory 710 shown in FIG. 7 is 'clipped' version of the Velocity Demand Trajectory 610 of FIG. 6. A graph of Actual Actuator Velocity 720 shown in FIG. 7 indicates the new lower peak demand velocity value 721 corresponding to the 'clipped' Velocity Demand Trajectory 710. The peak acceleration currents shown in the Simplified VCM Current profiles 630 and 730 of FIGS. 6 and 7 are the same for the first method of modifying the demand velocity profile, but the currents are modified in FIG. 7 to allow "cruising" at the new peak velocity. As can be seen in FIGS. 6 and 7, VCM current profile 630 includes acceleration phase 631 and deceleration phase 632, while VCM current profile 730 illustrated in FIG. 7 includes acceleration phase 731, cruise phase 732 and deceleration phase 733.

In accordance with the first method the peak velocity may be reduced by, for example 50%, by selecting 0.5 times the original peak demand velocity value. If the look up table minimum peak velocity at a particular distance-to-go is greater than 0.5 times the peak demand velocity value, then the peak demand velocity value can be limited to 0.5 times the peak demand velocity. This new lower peak demand velocity value is maintained until it is less than 0.5 times the peak demand velocity value at the present 'distance-to-go'. This ensures that the current profiles are not altered.

Figure 8:
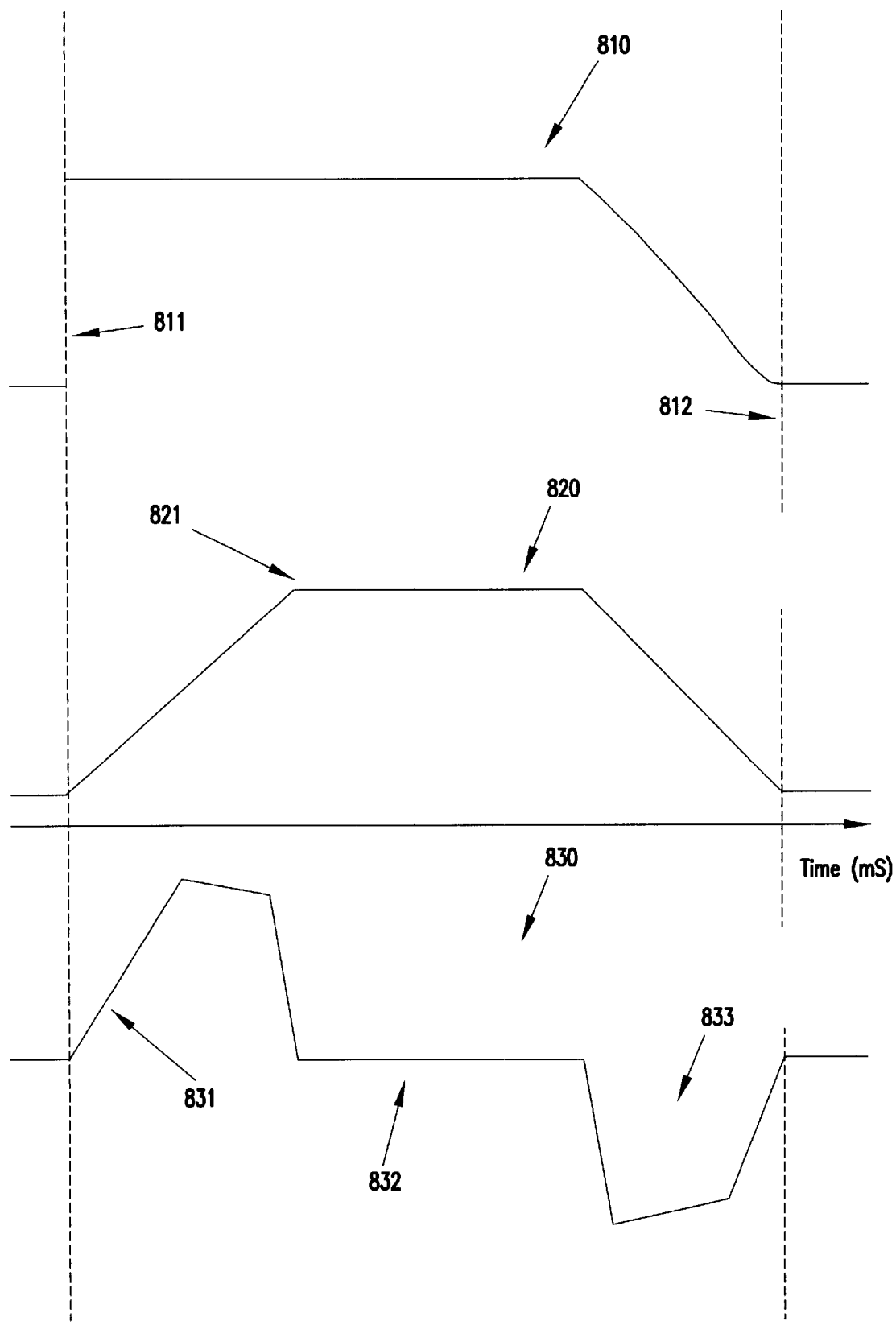
FIG. 8 is a group of graphical representations corresponding to the graphical representations of FIG. 7 with the velocity demand profile further altered by limiting the initial acceleration phase to reduce acoustics.

FIG. 8 shows graphs of a modified approach to the first method illustrated in FIG. 7. Illustrated in FIG. 8 are a velocity demand trajectory profile 810, an actual actuator velocity profile 820 and a simplified VCM current profile 830. The profiles are plotted between the time of the start of the seek (as designated by reference number 811) and the time of arrival at the destination track (designated by reference number 812). Velocity demand trajectory profile 810 and actual actuator velocity profile 820 are identical or similar to profiles 710 and 720 illustrated in FIG. 7. However, in the modified approach to the first method, simplified VCM current profile 830 differs from simplified VCM current profile 730 illustrated in FIG. 7. Like VCM current profile 730, VCM current profile 830 includes an acceleration phase 831, a cruise phase 832 and a deceleration phase 833. In contrast to VCM current profile 730 illustrated in FIG. 7, the VCM current is Slew Rate Limited during the initial acceleration phase 831. The VCM current is slewed to slow down the rate of change of current thereby modifying the initial acceleration phase which in turn reduces emitted acoustics.

Figure 9:
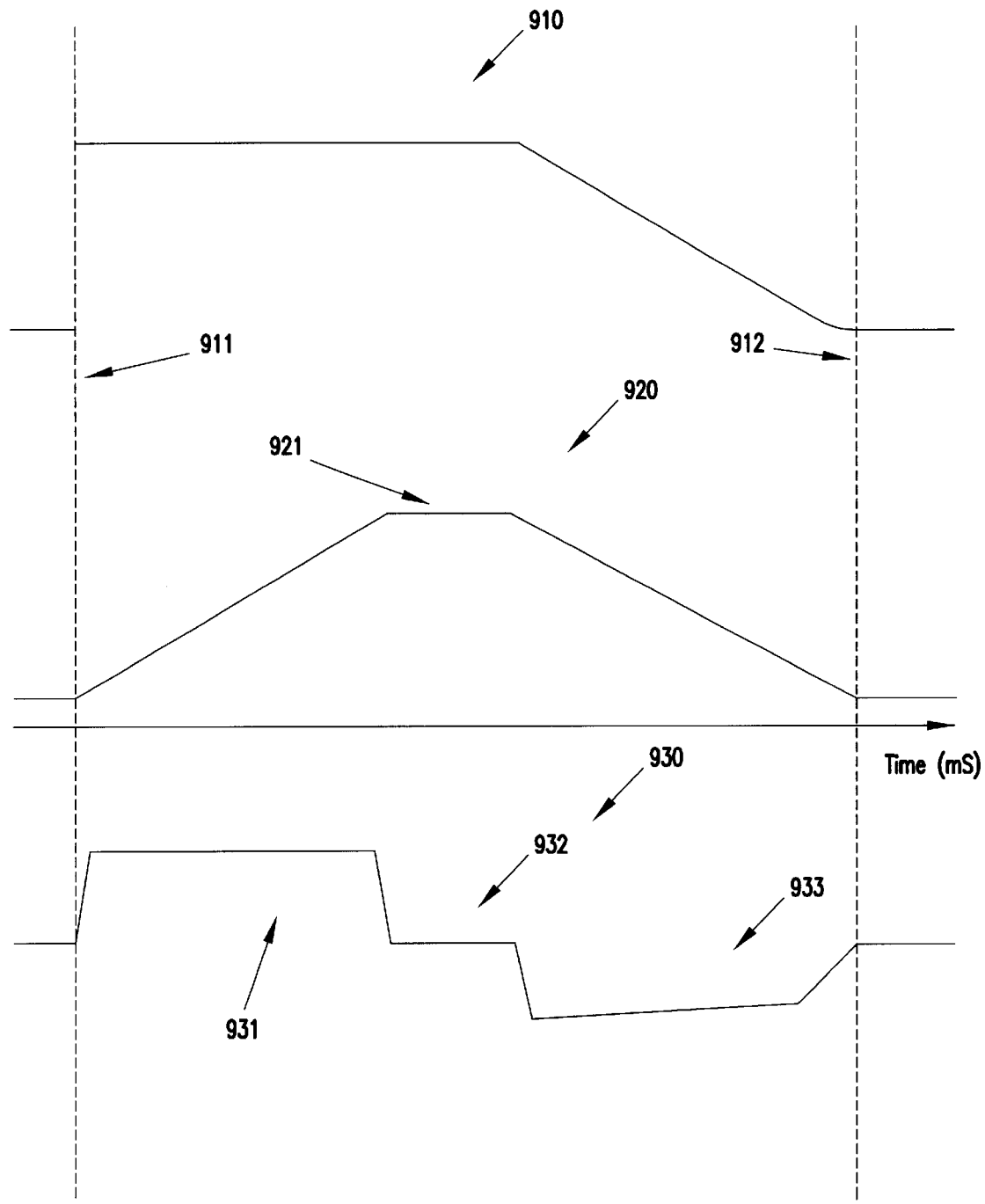
FIG. 9 is a group of graphical representations corresponding to the graphical representations of FIG. 6 with the velocity demand profile altered according to a second method.

In a second method, the demand velocity profile is modified to produce less aggressive acceleration and deceleration curves. FIG. 9 illustrates velocity demand trajectory profile 910, actual actuator velocity profile 920 and simplified VCM current profile 930 for an example utilizing the second method. Profiles 910, 920 and 930 are illustrated between the time at which the seek starts (designated by reference number 911) and the time of arrival at the destination track (designated by reference number 912). As with the first method there is a minimum peak velocity or threshold associated with the velocity demand profile. A new lower peak demand velocity 921 can first be determined as a function of the selected seek profile as long as the new lower peak demand velocity value does not fall below the minimum peak demand velocity. In addition, the second method also involves making the acceleration and deceleration of actuator 150 during phases 931 and 933 more gradual. The Actual Actuator Velocity 920 and Simplified VCM Current 930 graphs of FIG. 9 indicate more gradual acceleration and deceleration phases 931 and 933 as compared with corresponding graphs of FIG. 7 that reflect the first method. This in turn can shorten cruise phase 932. The second method may also involve just making the acceleration and deceleration of actuator 150 more gradual without reducing the peak demand velocity.

An additional enhancement can be made to the first method of altering velocity demand and acceleration profiles illustrated in FIG. 7. In the above method a single MAX_DIST value (representing the maximum or peak velocity that the seek will attain) may be inadequate over a large range of seek lengths (for example above 200 tracks). The assumption for this example has been that each JIT seek profile will attempt to perform a seek that takes exactly 1 millisecond more than the "higher order" JIT seek. A first level JIT seek should take exactly 1 millisecond longer than a normal seek. One can overcome the problem of needing more MAX_DIST values by creating several extra tables of MAX_DIST values that are searched using seek length as the search term. Although this is helpful, it may be inadequate to prevent seek time differences that vary too much from 1 millisecond. The desired MAX_DIST values were roughly a linear function of the seek length so an extra parameter for each MAX_DIST, called MAX_DIST_SLOPE, can be created. MAX_DIST_SLOPE is multiplied by the seek length to create a MAX_DIST modifier and then added to MAX_DIST itself as shown in Equation 4:

$$\text{MAX\_DIST} = \text{MAX\_DST}_{no\ min\ at} + \text{MAX\_DIST\_SLOPE} * (\text{SEEK\_LENGTH}) \quad \text{Equation 4}$$

Where SEEK_LENGTH is defined as the difference between the actual seek length and the minimum seek length for the particular range of seek lengths being considered. This makes it necessary to come up with a method of determining an appropriate MAX_DIST_SLOPE and $\text{MAX\_DIST}_{nominal}$ as part of the JIT seek tuning procedure. The following equations will give these two values assuming that two MAX_DIST values are known that will produce the desired seek time at two different seek lengths within the seek length range being considered. These MAX_DIST values and their corresponding seek lengths are denoted $\text{MAX\_DIST}_1$ & $\text{SEEK\_LENGTH}_1$ and $\text{MAX\_DIST}_2$ & $\text{SEEK\_LENGTH}_2$ in Equations 5 and 6.

$$\text{MAX\_DIST\_SLOPE} = \frac{\text{MAX\_DIST}_2 - \text{MAX\_DIST}_1}{\text{SEEK\_LENGTH}_2 - \text{SEEK\_LENGTH}_1} \quad \text{Equation 6}$$

$$\text{MAX\_DIST}_{no\ min\ at} = \text{MAX\_DIST}_1 * \text{SEEK\_LENGTH}_1 \quad \text{Equation 5}$$

Although this linear function provides more accuracy with regard to desired seek time, further modifications can be implemented. In the middle of a particular seek range, the seek times tend to bulge upwards in time, meaning that larger values of MAX_DIST than are given by the above procedure are necessary. A second order modifier may be used to add a small adjustment that is a function of the square of a value that represents how far away the seek length is from the center of the particular seek length range under consideration. Such an adjustment is described in Equation 7.

$$\text{MAX\_DIST\_ADJ} = \text{MAXIMUM\_MAX\_DIST\_ADJ} * \left[1 - \left(\frac{\text{SEEK\_LENGTH} - \text{MID\_SEEK\_RANGE}}{\text{MID\_SEEK\_RANGE}}\right)^2\right] \quad \text{Equation 7}$$

A useful feature evident from this equation is that all the variables are predetermined by the seek range and seek length except for the variable MAXIMUM_MAX_DIST_ADJ. However, this particular variable is in the exact form that is convenient to tune the adjustment to MAX_DIST that is desired. At the places where SEEK_LENGTH is close to either of the edges of the seek length range under consideration, the equation becomes zero.

In review of the invention as described above with reference to the drawings, a method 400 is disclosed of controlling an actuator 150 in a disc drive 100 to move a data head 160 from a current track to a destination track to implement an access. As shown at block 410 of FIG. 2, the method includes determining a first rotational position corresponding to a rotational position of the data head when the access will start. As illustrated at block 420, a second rotational position corresponding to a rotational position of the data head at a destination of the access is determined. At block 430, the access time required to move the data head from the first rotational position on an initial track to the second rotational position on a destination track using a fastest of multiple seek profiles is determined. As shown at block 440, the method includes determining a slower of the multiple seek profiles which can be used to move the data head from the first rotational position on the initial track to the second rotational position on the destination track within the determined access time. In some embodiments, determining the slower seek profile includes determining the slowest seek profile which can move the data head within the access time. The method also includes controlling the actuator using the determined slower or slowest of the multiple seek profiles to implement the access, as shown at block 450.

In some embodiments of the method of the invention, determining the first rotational position includes determining an ending rotational position for a first command performed immediately previous to the access, when a second command corresponding to the access and the first command are part of multiple queued commands. In these embodiments, the ending rotational position of the first command is the first rotational position.

In some embodiments of the method of the invention, determining the first rotational position includes retrieving the first rotational position from a register. In other embodiments of the method of the present invention, in which the disc surface 175 is divided into multiple radial sections (for example 170-1 through 170-8) and wherein each of the radial sections constitutes a phase, determining the first rotational position includes recording a first time at which an index mark 176 on the disc surface most recently passes under the data head 160 as illustrated at block 510 of FIG. 5; recording a second time at an instant when a next command, corresponding to the access, is received from the host system 110 as illustrated at block 520; determining a difference between the first time and the second time as illustrated at block 530; and dividing the difference by a known time required for the data head to traverse one phase in order to determine a current phase corresponding to the first rotational position as illustrated at block 540.

In some embodiments of the method of the present invention, determining the second rotational position (block 420) includes retrieving the second rotational position from a register, for example in the memory of seek controller 120.

In some embodiments of the present invention in which the disc surface is divided into multiple radial sections (for example 170-1 through 170-8) and in which each of the multiple radial sections constitutes a phase, determining the access time (block 430) further includes determining a phase difference between the first rotational position and the second rotational position, determining a number of revolutions between the first rotational position on the initial track and the second rotational position on the destination track using the fastest seek profile, and determining the access time as a function of the phase difference and of the number of revolutions. In some of these embodiments, determining access time further includes converting the phase difference into a unit of time by multiplying the phase difference by a constant time to cross each phase to obtain a first time, converting the number of revolutions into the unit of time by multiplying the number of revolutions by a constant time per revolution to obtain a second time, and adding the first and the second times to obtain the access time.

A disc drive data storage system 100 of the invention includes a data storage disc 170 providing a disc surface 175, a data head 160, an actuator 150 which supports the data head above the disc surface such that movement of the actuator causes movement of the data head, and a controller 120, 130 that controls the actuator to move the data head to implement an access. The controller 120, 130 is adapted to determine an access time to implement the access using a fastest of multiple seek profiles and to determine a slower or slowest of the multiple seek profiles that can be used to implement the access within the determined access time. The controller 120, 130 controls movement of the actuator using the determined slower or slowest of the multiple seek profiles.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive seek control functions, while maintaining substantially the same functionality without departing from the scope and spirit of the present invention.

Although the present invention has been described with reference to particular embodiments, workers skilled in the art will recognize that changes may be made in form and detail without departing from the spirit and scope of the invention.

What is claimed is:

1. A method of controlling an actuator in a disc drive to move a data head from a current track to a destination track to implement an access, the method comprising steps of:

(a) determining a first rotational position corresponding to a rotational position of the data head when the access will start;

(b) determining a second rotational position corresponding to a rotational position of the data head at a destination of the access;

(c) determining an access time required to move the data head from the first rotational position on an initial track to the second rotational position on a destination track using a fastest of a plurality of seek profiles;

(d) determining a slower of the plurality of seek profiles which can be used to move the data head from the first rotational position on the initial track to the second rotational position on the destination track within the determined access time; and (e) controlling the actuator using the determined slower of the plurality of seek profiles to implement the access.

2. The method of claim 1, wherein step (a) of determining the first rotational position comprises determining an ending rotational position for a first command performed immediately previous to the access, a second command corresponding to the access and the first command being part of a plurality of queued commands, and wherein the ending rotational position of the first command is the first rotational position.

3. The method of claim 1, wherein step (a) of determining the first rotational position comprises retrieving the first rotational position from a register.

4. The method of claim 1, wherein a disc surface is divided into a plurality of radial sections and wherein each of the plurality of radial sections constitutes a phase, and wherein step (a) of determining the first rotational position comprises steps of:

(a)(1) recording a first time at which an index mark on the disc surface most recently passes under the data head;

(a)(2) recording a second time at an instant when a next command, corresponding to the access, is received from the host system;

(a)(3) determining a difference between the first time and the second time; and (a)(4) dividing the difference by a known time required for the data head to traverse one phase in order to determine a current phase corresponding o the first rotational position.

5. The method of claim 1, wherein step (b) of determining the second rotational position comprises retrieving the second rotational position from a register.

6. The method of claim 1, wherein a disc surface is divided into a plurality of radial sections and wherein each of the plurality of radial sections constitutes a phase, and wherein step (c) of determining the access time to move the data head from the first rotational position on the initial track to the second rotational position on the destination track using the fastest of the plurality of seek profiles comprises steps of:

(c)(1) determining a phase difference between the first rotational position and the second rotational position;

(c)(2) determining a number of revolutions between the first rotational position on the initial track and the second rotational position on the destination track using the fastest seek profile; and (c)(3) determining the access time as a function of the phase difference and of the number of revolutions.

7. The method of claim 6, wherein step (c) of determining the access time as a function of the phase difference and of the number of revolutions comprises steps of:

(c)(1) converting the phase difference into a unit of time by multiplying the phase difference by a constant time to cross each phase to obtain a first time;

(c)(2) converting the number of revolutions into the unit of time by multiplying the number of revolutions by a constant time per revolution to obtain a second time; and (c)(3) adding the first and the second times to obtain the access time.

8. The method of claim 1, further comprising step (f) of determining a velocity demand profile as a function of a distance between the initial track and the destination track and the determined slower seek profile of the plurality of seek profiles.

9. The method of claim 8, further comprising step (g) of adjusting the determined velocity demand profile to further optimize the access.

10. The method of claim 1, wherein step (d) of determining the slower of the plurality of seek profiles further comprises determining a slowest of the plurality of seek profiles which can be used to move the data head from the first rotational position on the initial track to the second rotational position on the destination track within the determined access time.

11. A disc drive data storage system comprising:

a data storage disc providing a disc surface;

a data head;

an actuator which supports the data head above the disc surface such that movement of the actuator causes movement of the data head;

a controller that controls the actuator to move the data head to implement an access, wherein the controller is adapted to determine an access time to implement the access using a fastest of a plurality of seek profiles, and wherein the controller is further adapted to determine a slower of the plurality of seek profiles that can be used to implement the access within the determined access time, the controller controlling movement of the actuator using the determined slower of the plurality of seek profiles.

12. The apparatus of claim 11, where the slower of the plurality of seek profiles is a slowest of the plurality of seek profiles which can be used to implement the access within the determined access time.

13. The apparatus of claim 11, wherein the controller is further adapted to determine a first rotational position corresponding to a rotational position of the data head when the seek will start, and a second rotational position corresponding to a rotational position of the data head at a destination of the seek, and wherein the controller is adapted to use the first rotational position and the second rotational position to determine the access time and the determined slower seek profile.

14. The apparatus of claim 13, wherein the controller is further adapted to determine the first rotational position by determining an ending rotational position for a first command performed immediately previous to the access, a second command corresponding to the access and the first command being part of a plurality of queued commands, and wherein the ending rotational position of the first command is the first rotational position of the access.

15. The apparatus of claim 13, wherein the controller is further adapted to determine the first rotational position by retrieving the first rotational position from a register.

16. The apparatus of claim 13, wherein the disc surface is divided into a plurality of radial sections and wherein each of the plurality of radial sections constitutes a phase, and wherein the controller is further adapted to determine the first rotational position by:

recording a first time at which an index mark on the disc surface most recently passes under the data head;

recording a second time at an instant when a next command, corresponding to the access, is received from the host system;

determining a difference between the first time and the second time; and dividing the difference by a known time required for the data head to traverse one phase in order to determine a current phase corresponding to the first rotational position.

17. The apparatus of claim 13, wherein a disc surface is divided into a plurality of radial sections and wherein each of the plurality of radial sections constitutes a phase, and wherein the controller is further adapted to determine the access time to move the data head from the first rotational position to the second rotational position using the fastest of the plurality of seek profiles by:

determining a phase difference between the first rotational position and the second rotational position;

determining a number of revolutions between the first rotational position on an initial track and the second rotational position on a destination track using the fastest seek profile; and determining the access time as a function of the phase difference and of the number of revolutions.

18. The apparatus of claim 13, wherein the controller is further adapted to determine a velocity demand profile as a function of a distance between the initial track and the destination track of the determined slower seek profile of the plurality of seek profiles.

19. The apparatus of claim 13, wherein the controller is further adapted to adjust the determined velocity demand profile to further optimize the access.

20. A disc drive apparatus comprising:

a disc providing a disc surface; and means for controlling an actuator to move a data head over the disc surface to implement an access.

* * * * *

UNITED STATES PATENT AND TRADEMARK OFFICE
CERTIFICATE OF CORRECTION

PATENT NO.     : 6,445,531 B1
DATED          : September 3, 2002
INVENTOR(S)    : Mark A. Gaertner et al.

It is certified that error appears in the above-identified patent and that said Letters Patent is hereby corrected as shown below:

<u>Column 10,</u>
Line 35, delete "Equation 6" and insert -- Equation 5 --.
Line 41, delete "Equation 5" and insert -- Equation 6 --.

Signed and Sealed this

Thirty-first Day of December, 2002

JAMES E. ROGAN
*Director of the United States Patent and Trademark Office*